May 29, 1951
J. E. COLLINS
2,555,117
METHOD OF TRANSFERRING GLASSWARE FROM MOLD TABLES
Filed March 10, 1949
2 Sheets—Sheet 1
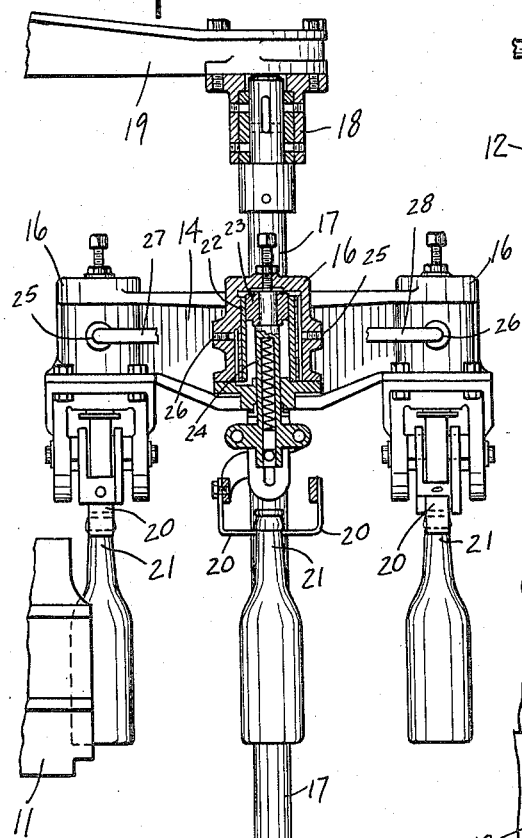
FIG. 2
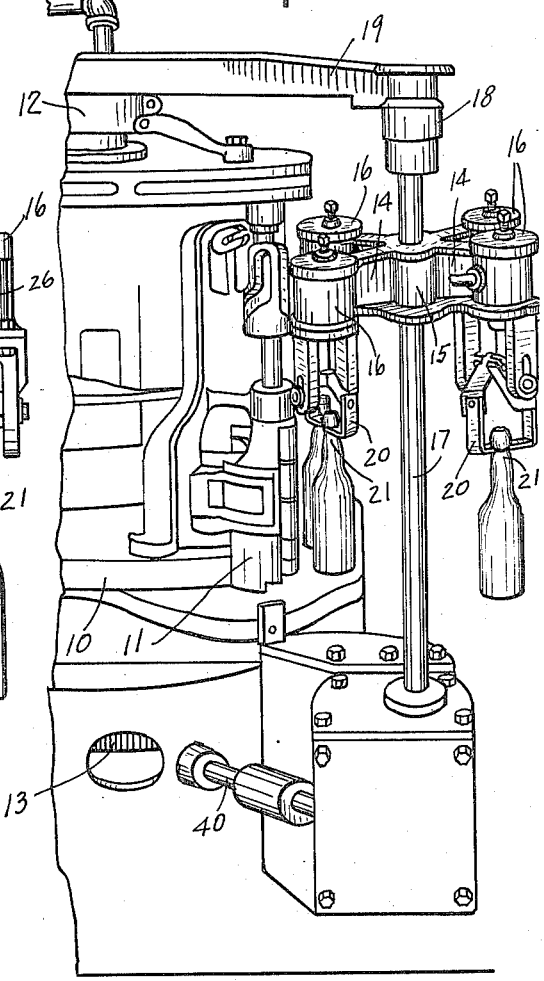
FIG. 1
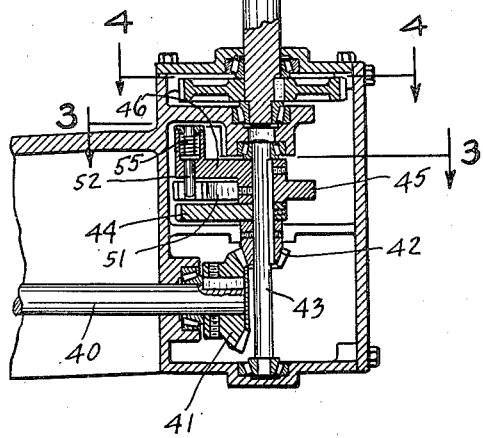
INVENTOR.
JAMES E. COLLINS.
BY Lockwood, Goldsmith & Galt
ATTORNEYS.

May 29, 1951 J. E. COLLINS 2,555,117
METHOD OF TRANSFERRING GLASSWARE
FROM MOLD TABLES
Filed March 10, 1949 2 Sheets-Sheet 2
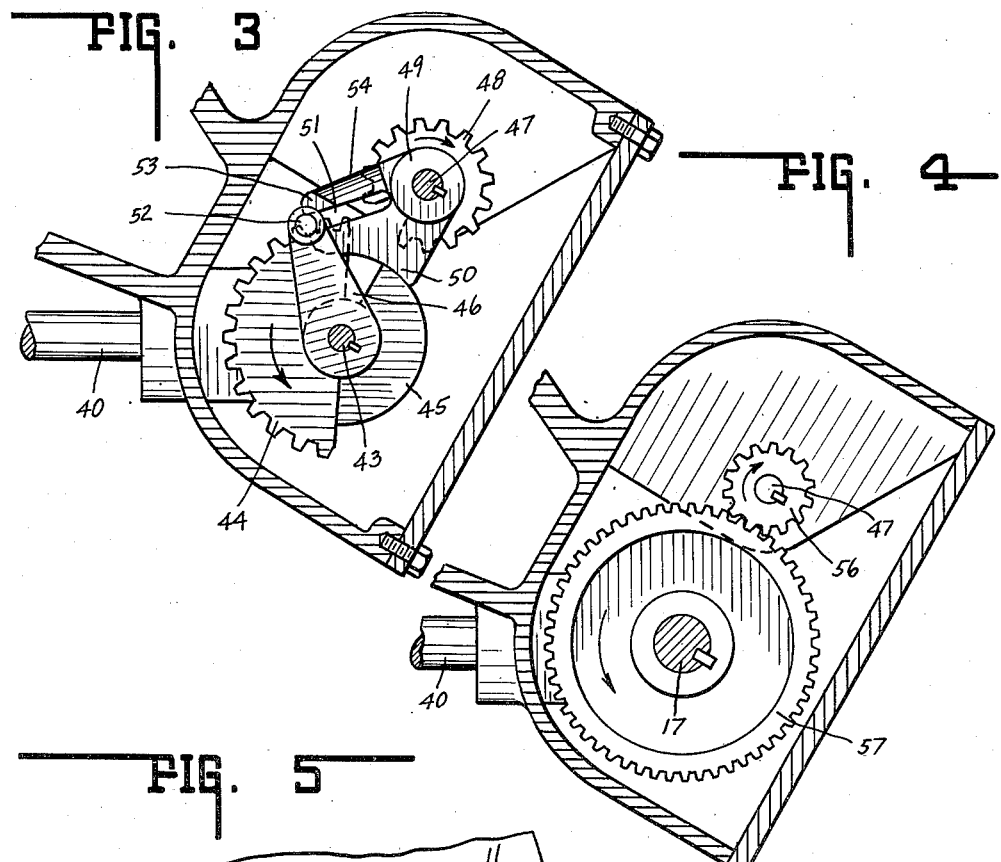
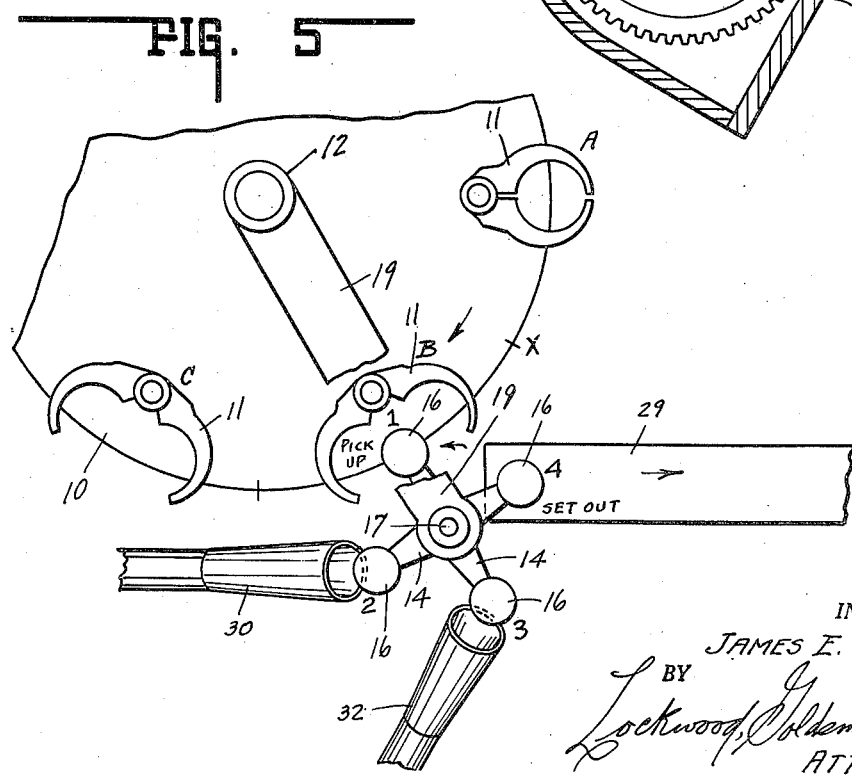
INVENTOR.
JAMES E. COLLINS.
BY
Lockwood, Goldsmith & Galt
ATTORNEYS.

Patented May 29, 1951

2,555,117

UNITED STATES PATENT OFFICE 2,555,117

METHOD OF TRANSFERRING GLASSWARE FROM MOLD TABLES

James E. Collins, Indianapolis, Ind., assignor to Fairmount Glass Works, Inc., Indianapolis, Ind., a corporation Application March 10, 1949, Serial No. 80,705

3 Claims. (Cl. 49—77)

This invention relates to a method of picking up, cooling and setting out glassware from an intermittently rotating mold table of a glass forming machine by grasping and picking up the ware at a pick-up station, transferring it to a cooling dwell station, and setting it out on a moving conveyor.

A well known and extensively used glass forming machine of this character is that known in the glass making industry as the Lynch "10" machine or the Lynch "16" machine, and to which reference is made for convenience in the understanding of this invention.

In such machines a mould table is driven intermittently with an indexing movement between dwell stations, the parison being received by the mould at one station and the finished bottle being removed by the take-out device at a succeeding dwell station. Such take-out device is intermittently driven in timed relation with the table by an interconnecting shaft driving the take-out spindle carrying a cross arm with two take-out heads through a one-half revolution. Thus, with such two head take-out device one head is at the pickup station to grasp the ware and remove it from the mould during the table dwell while the opposite head deposits a bottle on the conveyor during the dwell at its set out station. In such two head take-out the timing between the pickup and set out of the ware is of such duration as to limit the speed of the machine in its operation due to the temperature of the ware at the time that it is set out on the conveyor. If the machine is speeded up the cooling period between the time the ware leaves the mould and is set out on the conveyor becomes of such short duration that the ware may sag due to its semi-molten state. In such take-out devices the cooling period before the ware is set out is the same as the indexing period of the table between dwells.

It is, therefore, the purpose of this invention to improve upon the method practiced by this type of take-out device by providing it with one or more, preferably two, additional heads carried by supporting arms which are the duplicate of those in the two head device, and which are mounted transversely thereof so that the heads are equally spaced, and in case of a four head take-out are spaced 90 degrees apart instead of the 180 degrees of the two head device.

As applied to such a four head take-out device for example, the invention contemplates a relatively long dwell period at one or more cooling stations intermediate the pickup and set out stations, preferably over a blast of cooling air.

Through a suitable drive for the head it is, therefore, arranged to rotate only a quarter revolution in case of a four head take-out instead of one-half revolution, at the linear speed of rotation of the mould table whereupon it is caused to dwell during the continued indexing movement of the mould table. For example, in a four head take-out having the relative spacing of the heads the same as the present Lynch two head take-out, during one-half of the indexing movement of the table from one dwell station to the next, the take-out device will rotate a quarter revolution and then be brought to rest. The heads will be caused to dwell while the mould table continues the remaining half of its indexing movement and through its following dwell period. This provides a relatively long dwell of the heads to permit cooling of the ware, such as over an air blast whereby the ware will be sufficiently solidified to avoid danger of sagging when it is set out on the conveyor. The set out station may be two dwell stations from the pickup station to permit two cooling dwells of relatively long duration, or it may follow the first cooling dwell.

By means of this invention a relatively long cooling dwell period may be provided before the ware is set out on the conveyor which permits the forming machine to be speeded up substantially, or as much as 25% with the resultant production increase.

It may further be observed that by causing the dwell of the heads during a portion of the indexing movement of the table the radius of movement of a head will be no greater than that of the two head take-out, thereby avoiding destructive swinging of the ware through centrifugal force as would be the case with a device operating through such radius as would be necessary if the dwell was merely concurrent with the dwell of the table.

The full nature of the invention will be understood from the accompanying drawings and the following description and claims:

Fig. 1 is a perspective view illustrative of the take-out head associated with the mould table of the glass forming machine.

Fig. 2 is a section through the gear box with the respective shafts in elevation and through a portion of the take-out head with parts shown in elevation and with parts broken away.

Fig. 3 is an enlarged section taken on the line 3—3 of Fig. 2.

Fig. 4 is an enlarged section taken on the line 4—4 of Fig. 2.

Fig. 5 is a schematic illustration of the respective movements and dwells of the take-out device relative to the mould table.

By way of illustrating the method of this invention there is shown in the accompanying drawings a rotatable mould table 10 of a glass forming machine for supporting thereon a series of moulds 11 for forming glassware, said table being intermittently rotated by any suitable and well known drive mechanism through the supporting column 12 by the gear 13 mounted thereon. Such machines may be of the single table type, but in respect to the particular glass forming machines above mentioned there is provided in addition to the mould table a table carrying blank moulds to receive a gob of glass during a dwell in the rotation of the table and form a parison which is transferred to a mould 11 of the mould table 10 at a subsequent dwell station. If it is a single table machine, an intermittent drive is in driving engagement with the gear 13, or wherein it is a two table machine the gear 13 is driven from the blank mould table in timed relation therewith which in turn is driven by an intermittent drive. Such intermittent drives for the mould table of a glass machine are well known in the art and need only be referred to herein as comprising the usual Geneva drive or the usual air driven rack and pinion drive as commonly employed.

As best illustrated in Fig. 5, the table 10 is rotated in the direction of the arrow, the mould 11 being closed with the formed ware therein at the dwell station A and indexing from the station A to the station B during the dwell at which station the mould 11 is caused to open to permit the ware to be removed by the take-out device. The mould 11 then proceeds through the following indexing movement of the table to the dwell station C still in its open position, all as well understood in the art.

Adjacent the pickup dwell station B there is provided a take-out device comprising a pair of transverse horizontally supported cross arms 14 mounted on the rotating hub 15 to extend at right angles to each other. Each arm carries at its opposite ends a take-out head 16, there being provided four such heads equally spaced from the hub and with their centers 90 degrees from each other. The hub 15 is mounted on the drive shaft 17 having its upper end supported by the bearing sleeve 18 mounted on an overhead bracket arm 19. Said bracket arm is suitably mounted upon and supported by the mould table column 12.

Each head 16 is provided with a gripping jaw 20 depending therefrom in a position to grip the ware such as the neck of the bottle herein shown at 21. Said heads are each identical with and are similarly operated as the heads commonly employed in the above mentioned Lynch machines wherein a single cross arm 14 is employed with two heads as distinguished from the four heads herein shown carried by the transversely mounted cross arms. Thus, each head includes a cylinder having a cylinder sleeve 22 in which a pneumatic actuated piston 23 operates for raising and lowering the jaw 20 through the connecting rod 24. The cylinder is provided with pneumatic ports 25 and 26, the port 25 being connected with the pneumatic line 27 and the port 26 being connected with the pneumatic line 28, whereupon admission of compressed air through the port 25 will cause the jaw 20 to be lowered to its ware engaging take-out position when it reaches the dwell station B of the mould table, and again to set out the ware on the conveyor 29 when it reaches its set out station. Through suitable camming action as employed in said well known heads, the jaws 20 are opened and closed through the lowering and raising thereof by the piston 23 for grasping the ware to remove it from the mould table and releasing the ware at its set out position over the conveyor, reference also being had in this connection to the four head take-out device or transfer apparatus as shown and described in Letters Patent No. 1,808,689, granted June 2, 1931, to Stenhouse et al.

Whereas, the above mentioned Lynch take-out devices employed two heads, the speed of operation of the glass forming machine was limited by the cooling time between the pickup station of the head at B and the set out station on the conveyor. It was necessary to allow sufficient lapse of time in carrying the ware through the 180 degree movement to the set out station for it to become sufficiently cooled as to prevent sagging when set out on the conveyor. The movement through 180 degrees or a half revolution was of the same linear distance and linear speed of movement as the movement of the table from one dwell station to the other. This was necessary in order to permit the take-out head at the station B to move rapidly enough to avoid interference with the mould 11. Therefore, the two head take-out was driven in timed relation with the mould table and at the same linear speed, usually by a take-out shaft driven by the mould table gear 13.

Wherein four heads were used it was necessary, in connection with an intermittently driven mould table, to double the length of the cross arms supporting the heads so that the linear distance of their movement through 90 degrees was the same linear distance as the movement of the two head take-out through 180 degrees. This was essential in obtaining the same speed of movement as the table to avoid interference with the moulds. The swing due to the arcuate movement of greater radius through inertia caused the gripped bottle necks, wherein the ware comprised narrow necked bottles, to be deformed with the result that a slowing down of the mould table was necessary. Therefore, no advantage was gained in employing such a four head take-out device over the two head take-out, so far as increasing the cooling period of the ware before being set out on the conveyor, for permitting speeding up of the machine to increase production.

In such double size four head take-outs the head moved through its 90 degree arc with and throughout the indexing movement of the table between its dwell stations, and only dwelled at such 90 degree station for the short duration of the table dwell and concurrently therewith. Thus, insufficient dwell occurred to permit of any appreciable cooling operation.

According to the method of this invention, therefore, an additional transverse cross arm may be provided for supporting a second pair of heads in 90 degree spaced relation to the usual pair of heads without increasing the length of the cross arm in the four head device over that of the two head device. By retaining the same radius of movement, the inertia of the swing above referred to is thereby eliminated, the radius of travel and the speed of travel being the same as in the usual two head take-out. Due to the shortened movement to 90 degrees as distinguished from the previous 180 degrees, while retaining the same radius of travel and linear speed of rotation to avoid interference with the table mould, each head arrives at its 90 degree station upon the table travelling approximately one-half of its indexing movement. This permits the heads to have a longer dwell at each station to increase the cooling time. Thus, the dwell period of each head is not only that of the dwell period of the table, but in addition includes the period of the remaining travel of the table during its indexing movement.

The above timing relation between the table and the take-out device is illustrated in the schematic showing of Fig. 5. As the table starts to index from its station A to station B the take-out starts to index in the direction of the arrow at the same linear speed of movement. Upon the head leaving its station 1 and arriving at station 2, it will have travelled 90 degrees but only half the linear distance between the table indexing travel from A to B. Therefore, upon the head arriving at station 2 the table will have travelled only through the linear distance A—X. While the table is travelling the remaining distance of X—B, the said head dwells at station 2 and does not move on to station 3 until the next indexing movement of the table following its dwell.

At one or more of the dwell stations of the head, intermediate the pickup station 1 and the set out or conveyor station, there is provided a blower pipe 30 for discharging a forced blast of cooling air on the ware while it dwells. As shown herein, the set out station is at station number 4 for setting out the ware on to the conveyor 29. Wherein there are two cooling stations provided as at number 2 and number 3, a second blower 32 may be provided for further cooling the ware at station 3.

The pneumatic control of the heads and jaws is the same as that commonly used in a two head take-out device, but with the timing controlled to lower and close the jaw 20 at station 1 for picking up the ware, raising it clear of the table, and then continuing to grip it without any action while the head dwells at stations 2 and 3 during their respective cooling operations, the head lowering and the jaw opening at station 4 to set the ware out on the conveyor in the same manner as heretofore practiced in the two head take-out.

Any suitable drive may be employed, included among others an intermittent mutilated gear drive or a combination mutilated gear Geneva drive for arresting the movement of the take-out after a quarter revolution instead of the one-half revolution heretofore practiced. Said drive may be driven from the turntable drive in timed relation therewith and cause the take-out device to rotate at the same speed, but by arresting its rotation causing it to dwell upon a quarter revolution while the table drive continues to rotate through the remaining portion of its indexing movement.

As various types of pick-up devices and drives may be employed, this invention is not directed to nor does it include any particular device or drive, but for illustration there is shown herein a combination mutilated gear Geneva drive wherein a take off shaft 40 transmits intermittent rotation from the table gear 13 in the usual manner. Through the bevel gear 41 meshing with the bevel pinion 42 keyed to a stud shaft 43, said shaft is driven one revolution for each indexing movement of the table between dwell stations. Thus, if it is a six mould table having six dwells the shaft 43 will be driven one revolution for each 60 degree travel of the table.

Keyed to said shaft and rotating therewith there is a gear segment 44 adapted to be rotated in the direction of the arrow.

Travelling with said gear segment and secured to said shaft there is a segmental Geneva dwell segment 45 carrying a rotator arm 46. Mounted on an adjacent stud shaft 47 there is a mutilated pinion 48 having the same number of teeth with the same pitch as the teeth of the segmental gear 44 adapted to mesh therewith. Carried on the hub 49 of said pinion there is a Geneva segment including the usual concave dwell portion 50 adjacent a single Geneva slot 51 in which the rotator pin 52 of the rotator arm is caused to engage, the slot being defined on one side by the dwell portion 50 and on the other side by a driven arm 53 provided with a bevelled recess 54 through which the pin may be cammed into the slot as the Geneva segment is driven under the pin 52. Said pin is cammed upwardly against the tension of the spring 55 and is caused thereby to drop into the slot 51 after passing over the bevelled recess, whereupon the Geneva is driven by the pin and slot engagement with the mutilated gears out of engagement until the pin leaves the slot whereupon the dwell segment 45, being in engagement with the dwell portion 50, the gear 44 may make a partial revolution while the pinion 48 remains at rest.

Carried by the stud shaft 47 (Fig. 4) there is a gear 56 having a four to one gear ratio with its driven gear 57. Said gear 57 is keyed to the shaft 17 which rotates the take-out device. Thus, for one complete rotation of the gear 56, gear 57 and, therefore, the take-out device will be rotated a quarter revolution. Since the gear 56 rotates one revolution with the Geneva pinion 48, one revolution of the Geneva pinion will rotate the take-out device a quarter revolution. Therefore, during the initial indexing movement of the table, the gear 44 meshing with pinion 48 will rotate the take-out device at the same linear speed as the table until the take-out heads near their respective dwell stations. As they approach their respective dwell stations, the driving pin 52 enters the slot 51, the mutilated teeth of the gears demeshing so that the movement is decelerated as the 90 degree position is approached, the head arriving at the 90 degree station as the pin 52 leaves the slot 51. At this point the dwell segment 45 and portion 50 of the Geneva interengage so that as the gear 44 and the mould table continue to move, pinion 48 and, therefore, the pickup device, are caused to dwell while the air blast from the pipes 30, 32 effect their cooling operation on the ware.

From the foregoing, it will be observed that with the same size, structure, and operation of the present commonly used two head take-out device, three or more heads with three or more stations may be provided to permit the ware to dwell sufficiently long to receive a blast of cooling air before being set out on the conveyor. While four stations with two cooling stations are shown herein, it is obvious that more or less stations may be employed with one or more cooling stations. But it is essential that there be sufficient dwell at the cooling station to receive the benefit of an air blast, and the radius of travel not be so great as to cause the ware to swing due to centrifugal force. It is further essential that the head be rotated at the same linear speed as the table during at least its initial movement to avoid interference with the mould, wherefore such initial movement of the head must be arrested at its cooling station while the table continues the balance of its indexing movement.

The invention claimed is:

1. The method of picking up and setting out glassware from an intermittently rotating mould table carrying moulds indexed to a series of dwell stations, consisting in engaging and picking up the ware from a mould during a dwell of said table, moving said ware in a horizontal plane about a center of rotation spaced from said table at the same linear speed of movement as the movement of said mould during a portion of its movement between adjacent dwell stations, arresting the movement of said ware at a cooling station and suspending it over a blast of cooling air during the remaining portion of the movement of said mould between said dwell stations, moving said suspended ware from said cooling station to a set out station during a portion of the mould movement between the following dwell stations, and setting out said cooled ware upon a conveyor.

2. The method of picking up and setting out glassware from an intermittently rotating mould table carrying moulds indexed to a series of dwell stations, consisting in picking up the ware from a mould and suspending it during the dwell thereof and setting it out on a conveyor during a succeeding dwell, moving the suspended ware at the same linear speed of movement as the movement of the mould between dwell stations and in timed relation therewith, arresting the movement of the ware while suspended between its pickup from the mould and its set out on the conveyor for a portion of the time of rotation of the mould between its dwell stations and during the next following dwell of the mould, playing a blast of cooling air on the ware during its arrested movement, and moving said ware while suspended from its arrested cooling position to its set out position on the conveyor during a portion of the next following movement of the mould between dwell stations.

3. The method of picking up and setting out glassware from an intermittently rotating mould table carrying moulds indexed to a series of dwell stations and setting out the ware upon a conveyor spaced therefrom, consisting in picking up the ware from a mould during its dwell at a dwell station, moving the ware from said mould while suspended in an arcuate path through a horizontal plane at the same linear speed of movement as the movement of the mould with said arcuate path of movement tangential to the path of movement of the mould, arresting the movement of the suspended ware at a cooling station for a portion of the time interval during which the mould rotates to its next following dwell station, directing a blast of cooling air on the ware while arrested in suspended position and until said mould has completed dwell, and thereafter moving the ware in said arcuate path from its arrested cooling position to a position for setting out on the conveyor during a portion of the movement of the mould between succeeding dwell stations and in the same timed relation therewith as the movement of the ware from the mould to its arrested cooling position.

JAMES E. COLLINS.

REFERENCES CITED

The following references are of record in the file of this patent:

UNITED STATES PATENTS

| Number | Name | Date |
|---|---|---|
| 820,478 | Croskey | May 15, 1906 |
| 1,619,729 | Howard | Mar. 1, 1927 |
| 1,808,689 | Stenhouse et al. | June 2, 1931 |
| 1,890,883 | Morton et al. | Dec. 13, 1932 |
| 1,894,576 | Tremblay | Jan. 17, 1933 |
| 1,935,739 | Freese | Nov. 21, 1933 |
| 2,081,859 | Peiler et al. | May 25, 1937 |
| 2,180,737 | Hess | Nov. 21, 1939 |